(12) United States Patent  
Saleh

(10) Patent No.: US 8,306,703 B1
(45) Date of Patent: Nov. 6, 2012

(54) SIDE LOADING ATTACHMENT FOR FORKLIFT TRUCKS AND THE LIKE

(76) Inventor: Mohamad Saleh, Concord (CA)

( * ) Notice: Subject to any disclaimer, the term of this patent is extended or adjusted under 35 U.S.C. 154(b) by 560 days.

(21) Appl. No.: 12/557,337

(22) Filed: Sep. 10, 2009

Related U.S. Application Data

(60) Provisional application No. 61/096,784, filed on Sep. 13, 2008.

(51) Int. Cl.
*B60P 1/00* (2006.01)
*B62B 3/065* (2006.01)

(52) U.S. Cl. ............ 701/49; 701/50; 701/187; 701/222; 701/224

(58) Field of Classification Search .................... 701/36, 701/49–50; 187/222, 224
See application file for complete search history.

(56) References Cited

U.S. PATENT DOCUMENTS

| | | |
|---|---|---|
| 3,096,896 A | 7/1963 | Norton |
| 3,106,305 A | 10/1963 | Gehring |
| 3,166,209 A | 1/1965 | Haddock, Jr. |
| 3,561,620 A | 2/1971 | Willis |
| 3,572,530 A | 3/1971 | Ohntrup |
| 3,659,733 A | 5/1972 | Sinclair |
| 3,672,526 A | 6/1972 | Hansen |
| 3,762,588 A | 10/1973 | Hansen |
| 3,786,952 A | 1/1974 | Nearman |
| 3,836,031 A | 9/1974 | Weisker |
| 3,850,322 A | 11/1974 | Miles |
| 3,854,616 A | 12/1974 | Willis |
| 3,998,345 A | 12/1976 | Fiehler |
| 4,470,750 A | 9/1984 | Vockinger |
| 4,636,131 A | 1/1987 | Sinclair |
| 4,699,565 A * | 10/1987 | Seaberg .................. 414/785 |
| 4,708,575 A * | 11/1987 | Farmer et al. ............ 414/607 |
| 4,708,576 A * | 11/1987 | Conley ..................... 414/607 |
| 4,890,973 A * | 1/1990 | Frison et al. ............. 414/607 |
| 5,599,155 A | 2/1997 | Rohm |
| 6,256,566 B1 * | 7/2001 | Kamiya et al. ............ 701/50 |
| 6,758,649 B1 | 7/2004 | Scordilis |

* cited by examiner

*Primary Examiner* — Yonel Beaulieu

(57) ABSTRACT

In accordance with one embodiment of the present invention, a side loading attachment (20) for use with a forklift truck (50) comprises a guide frame (22) secured to the front of the forklift truck (50). A sliding bracket (23) is slidably mounted to the guide frame (22). The sliding bracket (23) is holding a support arm (28) which in turn holds a rotatable carriage (70) pivotally mounted to the support arm (28). The rotatable carriage (70) holds a couple of load forks (40) to deposit and retrieve a load (60) to either side of the forklift truck (50) in a narrow aisle.

7 Claims, 8 Drawing Sheets

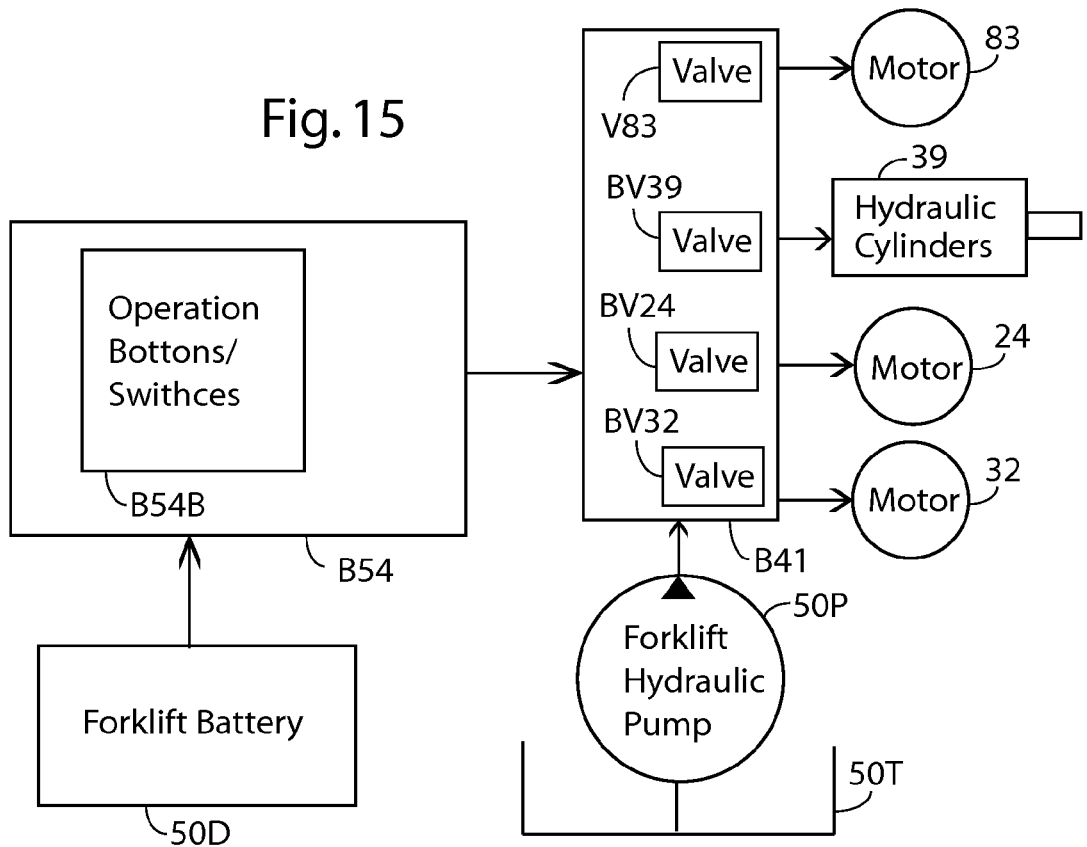
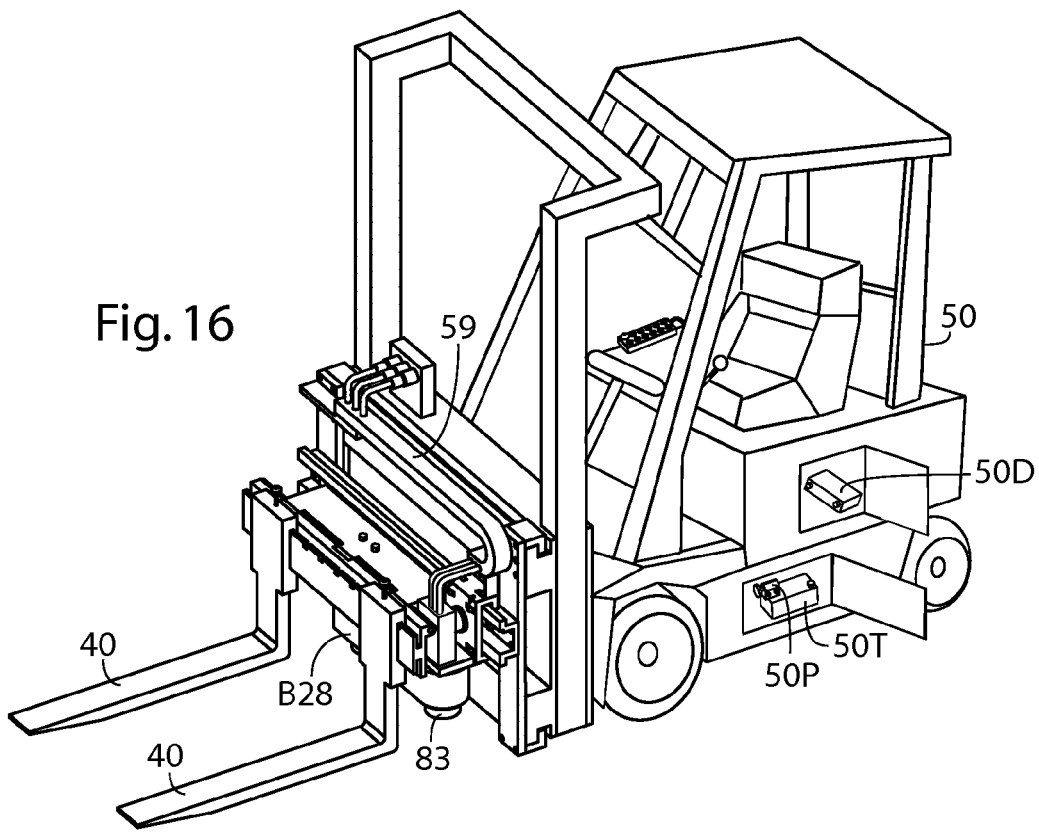

SIDE LOADING ATTACHMENT FOR FORKLIFT TRUCKS AND THE LIKE

CROSS-REFERENCE TO RELATED APPLICATIONS

This application claims the benefits of provisional patent application Ser. No. 61/096,784 filed Sep. 13, 2008 by the present inventor.

FEDERALLY SPONSORED RESEARCH

Not Applicable

SEQUENCE LISTING OR PROGRAM

Not Applicable

BACKGROUND—FIELD

This application relates to material handling vehicle attachments, specifically to forklift trucks side loading attachments.

BACKGROUND—PRIOR ART

Conventional forklift trucks are known for their ability to handle a wide variety of warehousing jobs. However, their uses are restricted in narrow aisles. Special forklift trucks that can work in narrow aisles are relatively costly in both initial and operating costs.

Several side loading attachments for conventional forklift trucks have been proposed. For example, U.S. Pat. No. 3,672,526 issued Jun. 27, 1972 for Howard C. Hansen shows a removable side loading attachment with its forks starting after the forklift forks to be able to pick-up a palletized load at ground level. This attachment severely increases the distance between the load being carried and the forklift carriage which leads to a considerable decrease in the load capacity of the forklift truck. Another example of a removable side loading attachment is U.S. Pat. No. 3,998,345 issued Dec. 21, 1976 to Raymond H. Fiehler which shows a removable side loader for forklift trucks having forks which can be shifted laterally relative to the fork lift truck. This attachment has the ability to pickup or release only limited height loads that can fit between the attachment forks and the fixed forks of the forklift truck. Also the height of this attachment may interfere with the warehouse ceiling when depositing a load to the top racks in the warehouse.

U.S. Pat. Nos. 3,659,733 issued May 2, 1972 and 4,636,131 issued Jan. 13, 1987 both for Stuart W. Sinclair and 6,758,649 issued Jul. 6, 2004 for Frank P. Scordilis show fixed attachments for fork lift trucks having shiftable forks for side loading. Fixed attachments require extensive and costly modifications to the forklift trucks and it is not easy to return the forklifts to their original condition as conventional forklift trucks whenever needed. Another disadvantage of those fixed attachments is that they reduce the loading capacity of the forklift trucks significantly because of the space they occupy between the load being carried by the forklift truck and the forklift carriage.

BRIEF SUMMARY OF THE INVENTION

This invention permits a conventional forklift truck to be converted quickly to a narrow aisles truck. An attachment where a guide frame is secured to the front of the forklift truck, a sliding bracket is slidably mounted to the guide frame, a support arm is mounted to the sliding bracket, a rotatable carriage is pivotally mounted to the support arm, and a pair of load forks is mounted to the rotatable carriage, the load forks can be shifted to the side of the truck to pickup or release a load in a narrow aisle.

It is an object of the present invention to provide a side loading attachment, to be mounted upon a conventional forklift truck or a material handling vehicle, to enable pick-up or release of a load in any direction up to 90 degrees to either side of the lift truck centerline for use in narrow aisles as well as other material handling operations.

It is a further object of the present invention to provide a side loading attachment which is simple in design, durable in usage, compact in size, which can be economically produced and which can be mounted or removed from the forklift truck at a substantial speed.

Still a further object of one embodiment of the present invention is to provide a side loading attachment that can be carried by a pair of forks of the forklift truck and is able to deposit or retrieve a palletized load at ground level to the side of the forklift forks.

Still a further object of the present invention is to provide a side loading attachment to enable the forklift truck to retrieve or deposit a load to the side of the truck close to the forklift carriage to maintain adequate side loading capacity for the forklift truck.

Still a further object of one embodiment of the present invention is to provide a side loading attachment that can be used as well for front loading and maintains adequate front loading capacity for the forklift truck.

Yet a further object of the present invention is to provide a side loading attachment that requires little or no substantial change in the construction of the forklift truck.

BRIEF DESCRIPTION OF THE DRAWINGS

In the drawings:

FIG. 15 is a block diagram illustrating the main components of the remote control, the valves assembly and their connections to other parts in the alternative embodiment of the attachment.

FIG. 16 is a perspective view of the forklift truck carrying the alternative embodiment of the attachment for a front loading operation.

DETAILED DESCRIPTION

Figure 1:
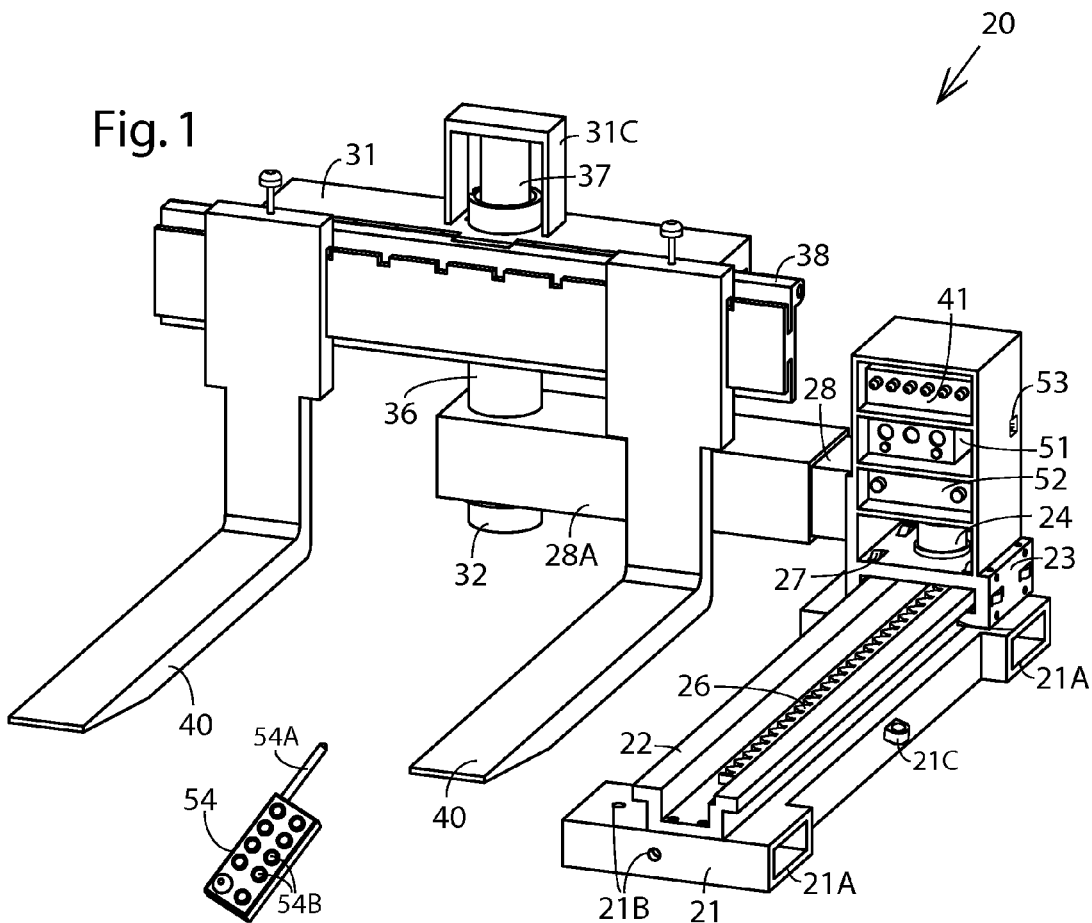
FIG. 1 is a perspective view of the attachment and its remote control.
Figure 2:
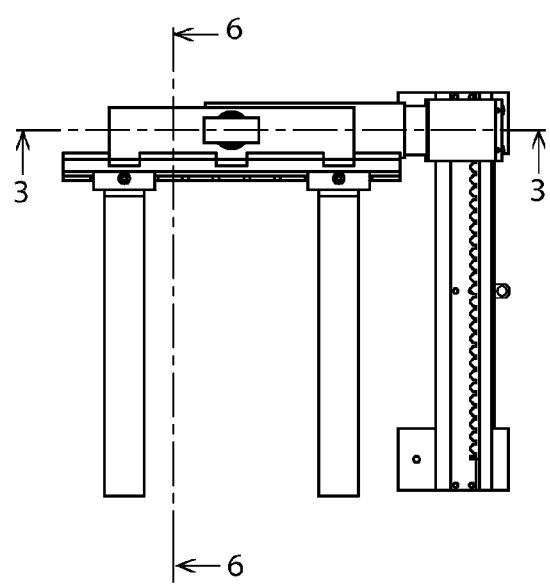
FIG. 2 is a top view of the attachment.

Referring to FIGS. 1 to 4, an attachment designated entirely by the numeral 20 comprises a support frame 21 having a pair of parallel hollow channels or sleeves 21A to receive a pair of forklift forks 50A which is mounted to a forklift carriage 50B of a forklift truck 50. The carriage 50B is elevatable or movable vertically by normal operation of the forklift truck 50. The support frame 21 can be secured to the forklift forks 50A by fastening bolts or screws (not shown) in threaded holes 21B located on the support frame 21. The support frame 21 can also be chained to the carriage 50B by a chain bracket 21C located on the support frame 21.

A guide frame 22 is fastened to the support frame 21. A sliding bracket 23 having track, thrust or guide rollers 27 is slidably mounted to the guide frame 22. A drive in the form of a reversible hydraulic motor 24 is fastened to the sliding bracket 23. A gear pinion 24A is secured to the hydraulic motor 24 and meshes with a toothed rack 26 which is fastened to the guide frame 22. When the motor 24 rotates the gear pinion 24A, the sliding bracket 23 moves along the guide frame 22.

A support arm 28 is rigidly mounted to the sliding bracket 23. A telescoping support arm 28A is mounted to the support arm 28 in sliding engagement. A double acting hydraulic cylinder 30 having a piston 30A is suitably secured to the support arm 28 from one end and to the telescoping support arm 28A from the other end. When hydraulic pressure enters the hydraulic cylinder 30, it causes the piston 30A to extend or retract causing the telescoping support arm 28A to extend or retract in the same direction.

A rotatable frame 31 is pivotally mounted to the telescoping support arm 28A by a cylindrical post 36. The post 36 can rotate inside the telescoping support arm 28A. The rotatable frame 31 has a slot, a groove or a keyway 31A that mates another keyway 36A located on the cylindrical post 36. A rectangular key bar 36B is inserted slidably inside the keyways 31A and 36A then suitably fastened to the post 36 with suitable bolts or fasteners (not shown). The key bar 36B allows the rotatable frame 31 to slide vertically on the post 36, but cannot rotate relatively to the post 36.

A drive in the form of a reversible hydraulic motor 32 is fastened to the telescoping support arm 28A. A two piece shaft coupling 35 and 35A is rigidly secured to the hydraulic motor 32 from one side and to the post 36 from the other side. When the motor 32 rotates the coupling 35 and 35A, the post 36 and the rotatable frame 31 also rotate in the same direction. Two thrust bearings 33 and 34 are inserted between the support arm 28A and the post 36 to allow the post 36 to rotate easily inside the telescoping support arm 28A.

A hydraulic cylinder 37 having a piston 37A is suitably secured from one end to an extension 31C which is welded to the rotatable frame 31, and secured from the other end to the post 36. When hydraulic pressure enters the hydraulic cylinder 37, it pushes the piston 37A causing the rotatable frame 31 to slide up or down vertically on the post 36 and the key bar 36B.

Figure 3:
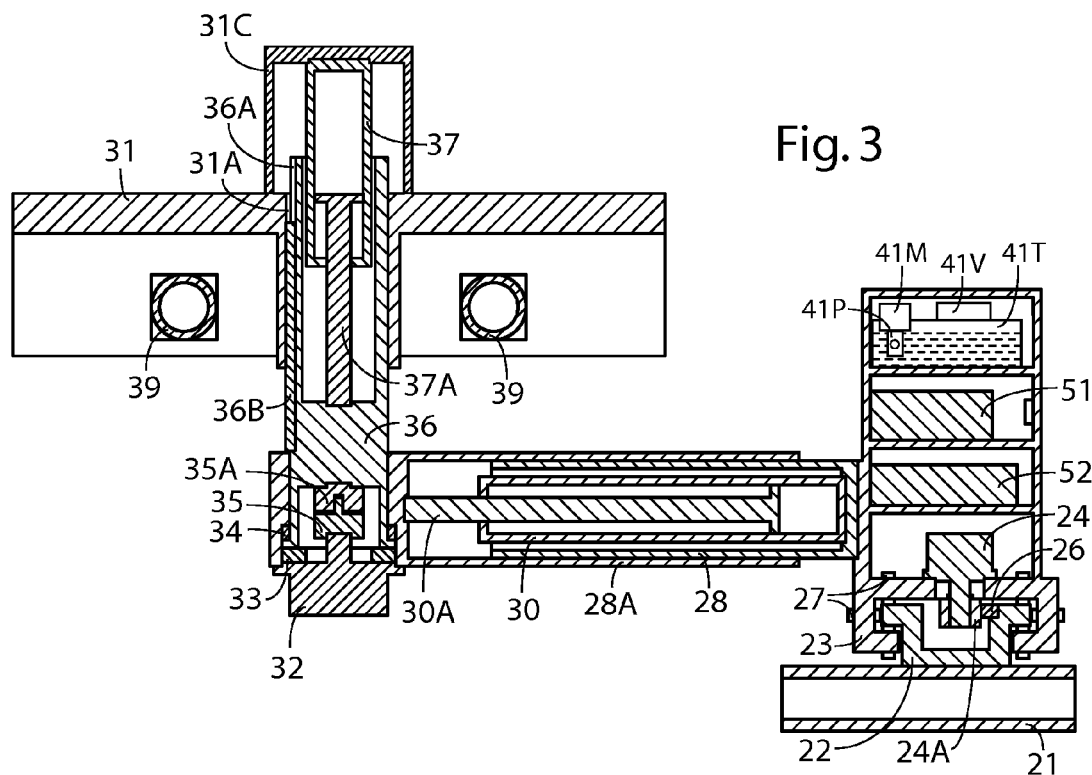
FIG. 3 is a sectional view of the attachment at line 3-3 in FIG. 2.
Figure 4:
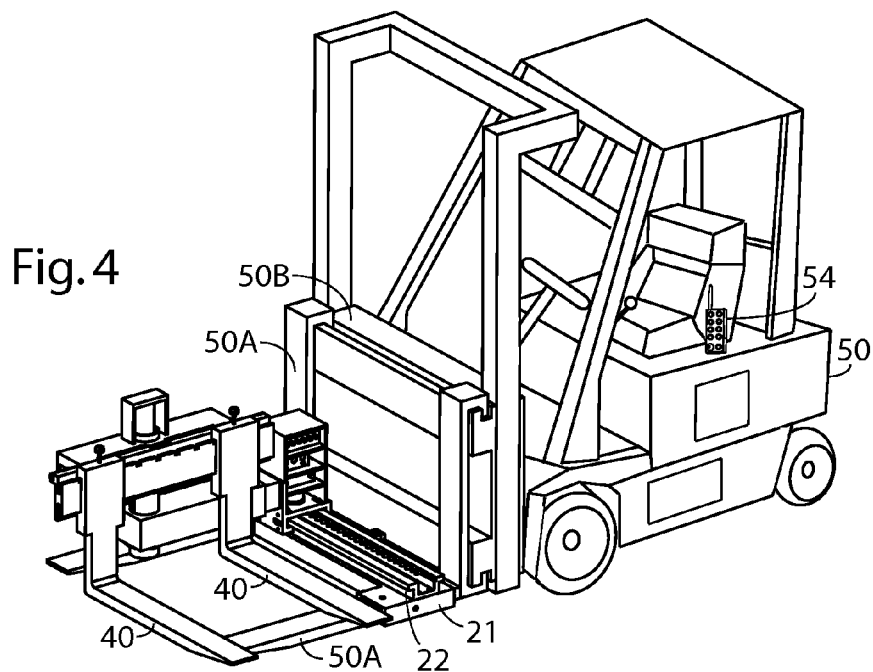
FIG. 4 is a perspective view of the forklift truck carrying the attachment.
Figure 5:
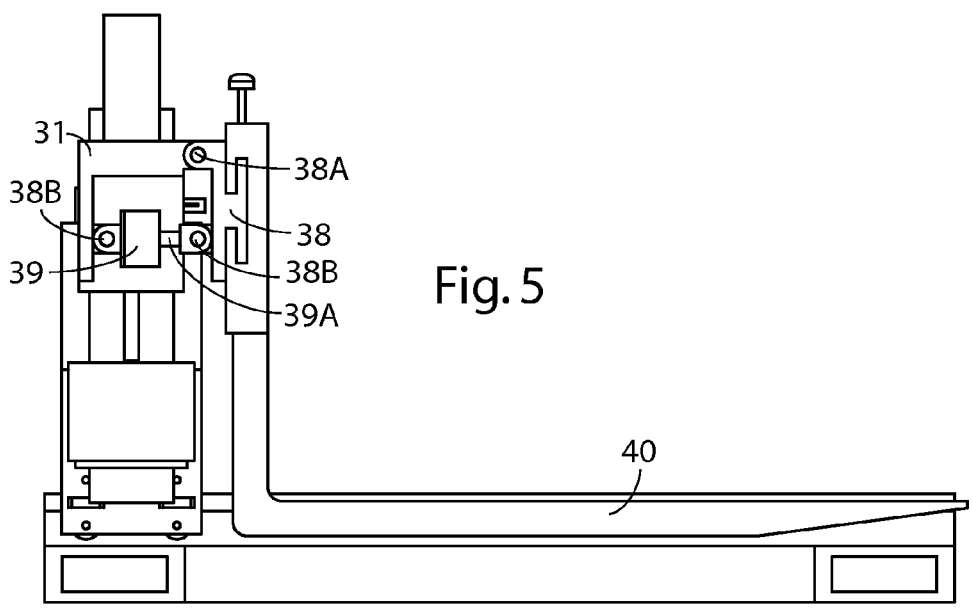
FIG. 5 is a side view of the attachment.
Figure 6:
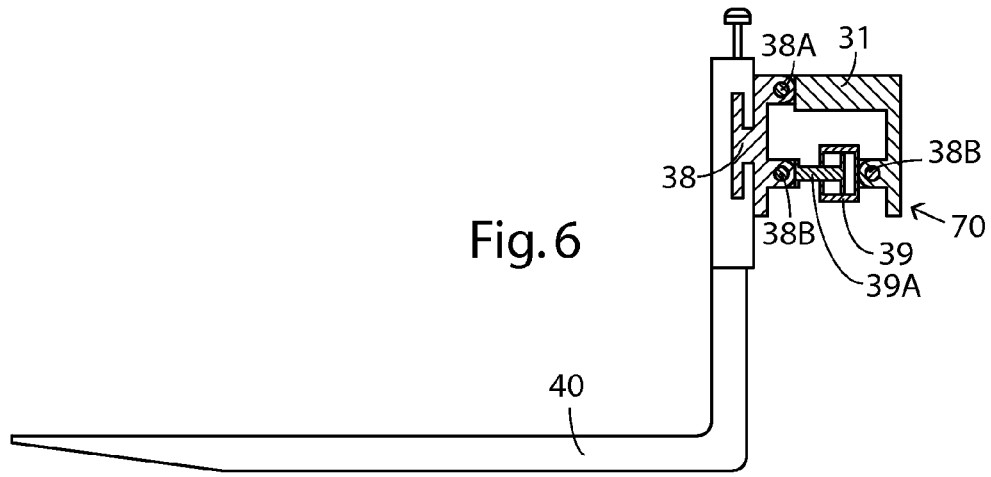
FIG. 6 is a sectional view of the attachment at line 6-6 in FIG. 2.

Referring to FIGS. 3, 5 and 6, a rotatable carriage assembly 70 includes a tiltable frame 38, a pair of clevis end hydraulic cylinders 39 and the rotatable frame 31 mentioned above. The tiltable frame 38 is pivotally mounted or hinged to the rotatable frame 31 by a hinge pin 38A. Each of the hydraulic cylinders 39 has a clevis end piston 39A. The cylinders 39 and the pistons 39A are pivotally connected to the rotatable frame 31 from one end and to the tiltable frame 38 from the other end by pivoting pins 38B.

A pair of load forks 40 is slidably mounted to the tiltable frame 38. When hydraulic pressure enters the cylinders 39, it pushes the pistons 39A and the load forks 40 can be tilted fore and aft.

Figure 8:
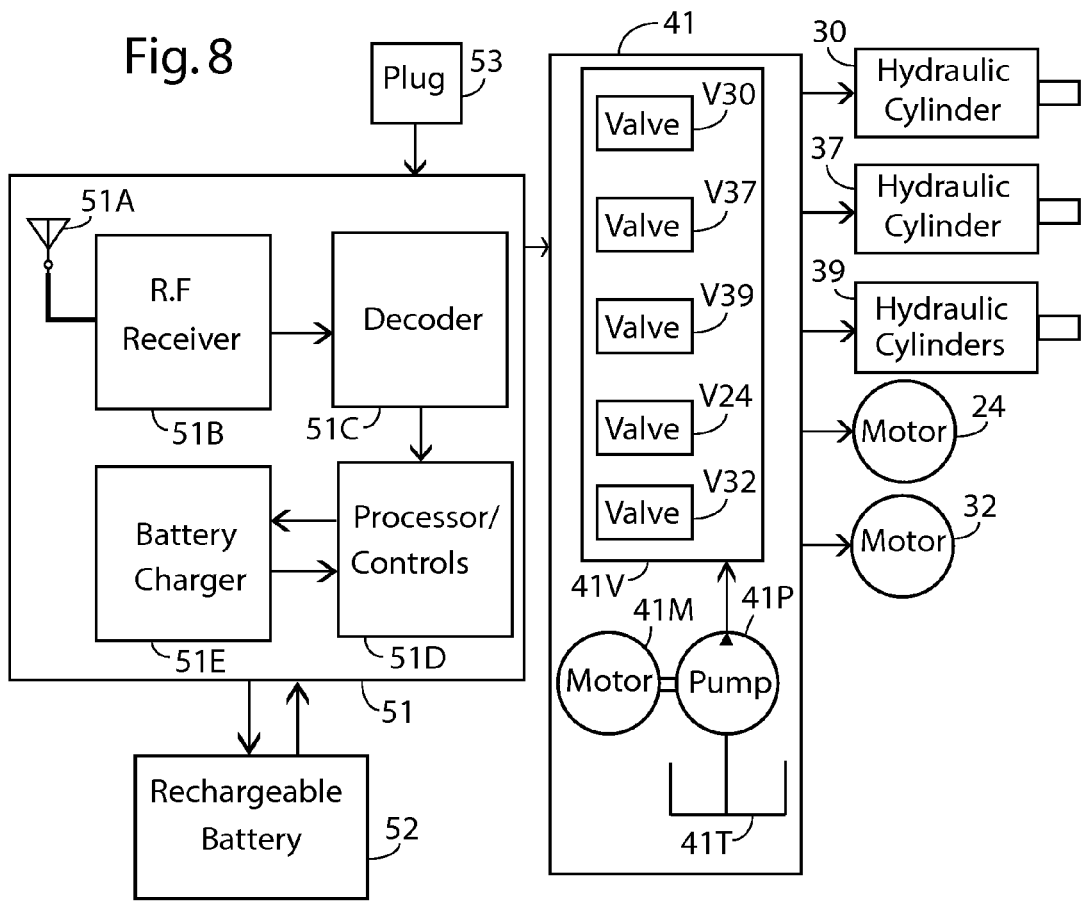
FIG. 8 is a block diagram illustrating the main components of the control unit, the hydraulic unit and their connections to other parts.

Referring to FIGS. 1, 3 and 8, a conventional hydraulic power supply or unit 41 comprises a pump 41P, an electrical motor 41M, a hydraulic valves assembly 41V and a fluid source or tank 41T. The valves assembly 41V comprises hydraulic directional control valves V30, V37, V39, V24 and V32 to direct hydraulic pressure from the pump 41P to the cylinders 30, 37, 39 and to the hydraulic motors 24 and 32 respectively.

A control unit 51 comprises an antenna 51A, a receiver 51B, a decoder 51C, a processor and controls 51D, and a battery charger 51E. The control unit 51 is electrically wired to the hydraulic unit 41 to supply electrical power to the motor 41M and to electrically activate the valves V30, V37, V39, V24 and V32 to direct hydraulic pressure from the pump 41P to the hydraulic cylinders 30, 37 and 39 and the motors 24 and 32 respectively. The control unit 51 receives electrical power from a rechargeable battery 52 when the attachment 20 is in use. The control unit 51 is wired to a conventional electrical plug 53 which can be connected to a conventional electrical extension cord (not shown), which in turn is connected to a conventional electrical power outlet (not shown) so that the charger 51E charges the battery 52 when the attachment 20 is not in use.

Figure 9:
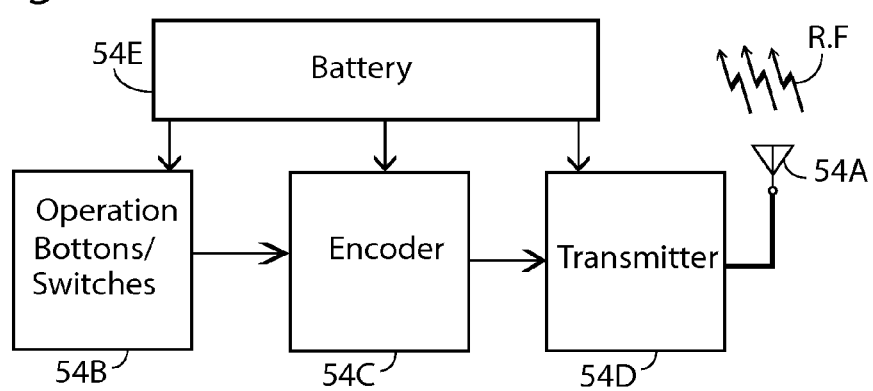
FIG. 9 is a block diagram illustrating the main components of the remote control.

In FIGS. 1 and 9, a remote control 54 comprises an antenna 54A, push buttons and switches 54B, an encoder 54C, a transmitter 54D, and a battery 54E. The remote control 54 communicates with the control unit 51 by transmitting one or more radio frequency control signals R.F to the control unit 51. Other forms of remote or wireless transmission may be utilized. Alternatively, the remote control 54 can communicate with the control unit 51 by means of communication cord or cable (not shown).

In view of the previous, a driver (not shown) of the forklift truck 50 using the remote control 54 can rotate the load forks 40 to the desired side of the lift truck 50 by sending the control signals R.F to the control unit 51 which in turn activate the valve V32 to direct hydraulic pressure from the hydraulic pump 41P to the reversible hydraulic motor 32. The driver can shift the load forks 40 to either side of the lift truck 50 by sending the control signals R.F to the control unit 51 which activate the valve V24 to direct hydraulic pressure to the reversible hydraulic motor 24. The driver can also tilt the load forks 40 fore and aft by sending the control signals R.F to the control unit 51 which activate the valve V39 to direct hydraulic pressure to the hydraulic cylinders 39.

The driver can lower or raise the load forks 40 relatively to the forklift forks 50A by sending the control signals R.F to the control unit 51 which activate the valve V37 to direct hydraulic pressure to the hydraulic cylinder 37. The purpose of the hydraulic cylinder 37 is to enable the load forks 40 to operate near ground level, just above the horizontal section (usually called blades) of the forklift forks 50A.

Figure 7:
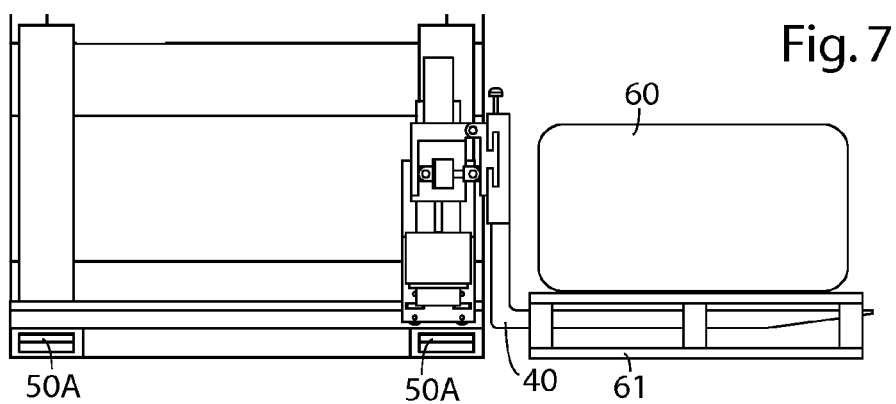
FIG. 7 is illustrating parts of the fork lift truck carrying the attachment, in which the attachment forks are shifted to the side of the forklift truck to engage a palletized load at ground level.

In FIG. 7, a load 60 is palletized by a pallet 61 and stored inside narrow aisle racks (not shown) at ground level. When the load 60 needs to be retrieved, the forklift driver places the load forks 40 in front of and facing the pallet 61, lowers the forklift forks 50A (which is a normal operation of the forklift 50) and the support frame 21 to ground level, activates the cylinder 37 (by activating the valve V37 as explained earlier) to lower the load forks 40 to just above the forklift forks 50A, activates the motor 24 to shift and insert the load forks 40 inside the pallet 61, activates the cylinder 37 to raise the load forks 40 and the pallet 61 above the level of the forklift forks 50A and the support frame 21, then activates the motor 24 in the reverse direction to retract the load forks 40 carrying the pallet 61 from the racks. There should be enough space between the load 60 and the racks above it (not shown) to allow the pallet 61 to be raised above the forklift forks 50A and the support frame 21. If there is enough space to lift the pallet 61 above the guide frame 22 then the driver can retrieve the load 60 closer to the vertical section of the forklift forks 50A (usually called shanks) for better loading capacity for the forklift truck 50. Depositing the pallet 61 to ground level is the reverse of the previous steps.

In case the pallet 61 was not high enough for the load forks 40 to be inserted as described above then the load forks 40 can reach ground level by activating the hydraulic cylinder 30 shown in FIG. 3 to extend the telescoping support arm 28A so that the load forks 40 are advanced forward beyond the forklift forks 50A. The load forks 40 then can be lowered to ground level by activating the cylinder 37 then shifted and inserted in or under the pallet 61 by activating the motor 24. The capacity of the forklift 50 will be reduced because the load 60 is far away from the forklift carriage 50B. This reduction in capacity can be avoided if after the load forks 40 is shifted and inserted in or under the pallet 61, the forklift driver starts retracting the cylinder 30 while at the same speed driving the forklift 50 forward until the cylinder 30 is completely retracted, then the pallet 61 can be lifted by activating the cylinder 37 then retrieved from the racks by activating the motor 24. It should be noted that the forklift forks 50A and the load forks 40 are at about the same level so the load forks 40 should be shifted enough to the side of the forklift truck 50 to clear off and not hit the forklift forks 50A when retracted. Depositing the load 60 to ground level in such a case (when the pallet 61 is not high enough) is the reverse of the previous steps. It should be also noted that the cylinder 37 enables the load forks 40 to reach close enough to ground level to engage most standardized types of the pallet 61. Consequently, the telescoping support arm 28A and the cylinder 30 can be eliminated if total or full ground level reach for the load forks 40 is not needed.

If the pallet 61 was well above ground level then retrieving it can be done by keeping the load forks 40 high enough above the forklift forks 50A (so that the pallet 61 doesn't hit the forklift forks 50A during retrieving), activating the motor 24 to shift and insert the load forks 40 in the pallet 61, raising the forklift forks 50A (which is a normal operation of the forklift truck 50) to raise the pallet 61 a little to take its weight off the racks (not shown), then activating the motor 24 in the reverse direction to retract the load forks 40 and retrieve the pallet 61 from the racks.

Various changes can be made without departing from the scope of this embodiment, for example, the forklift truck 50 can supply hydraulic pressure to the hydraulic unit 41 by suitable hydraulic hoses (not shown), meaning that the hydraulic unit 41 does not need to have the pump 41P, the motor 41M and the fluid tank 41T. It is also possible to supply electrical power from the forklift 50 to the control unit 51 by suitable electrical cable (not shown) to eliminate the need for the rechargeable battery 52 and the battery charger 51E. It is also possible to replace the hydraulic unit 41 and the remote control 54 with manually operated directional control valves (not shown) that receive hydraulic pressure from the forklift truck 50 and direct it to each of the motors 24 and 32 and to the hydraulic cylinders 30, 37 and 39 by suitable hydraulic hoses (not shown). It is also possible to make the motors 24 and 32 electrical instead of hydraulic type and receive electrical power from the control unit 51. It is also possible to extend the support frame 21 all the way to the motor 32 so that the motor 32 and the post 36 can be mounted directly to the sliding bracket 23.

FIGS. 10 to 16 show an alternative embodiment of the invention, where the letter B is added before some numerals to represent a part that was modified from the first embodiment, while the parts used with no change from the first embodiment will have no change in the numerals representing them.

Figure 10:
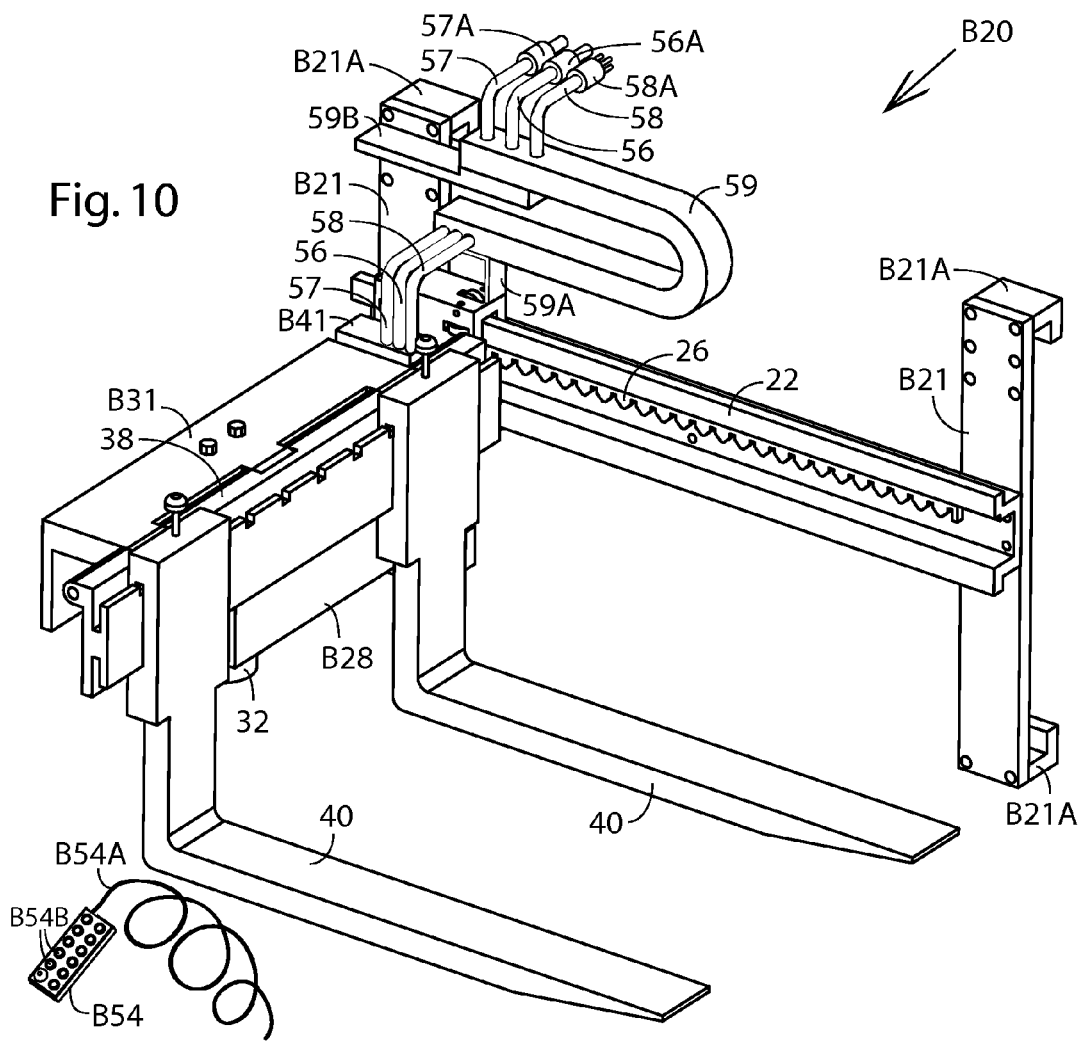
FIG. 10 is a perspective view of an alternative embodiment of the attachment and its remote control.
Figure 11:
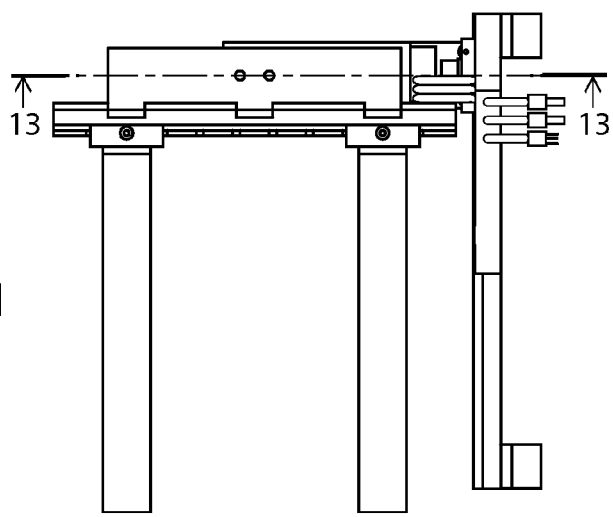
FIG. 11 is a top view of the alternative embodiment of the attachment.

In FIGS. 10 to 13A, an attachment designated entirely by the numeral B20 comprises a couple of support bars B21 which are rigidly mounted or clamped to the forklift carriage 50B by clamps or hooks B21A. The hooks B21A can be fastened or bolted to different locations on the support bars B21 as shown in FIG. 10 to fit the size of the carriage 50B. The forklift forks 50A shown in the first embodiment in FIG. 4 were removed from the forklift truck 50 to allow the support bars B21 to be secured to the carriage 50B.

The guide frame 22 (same part from the first embodiment) is fastened to the support bars B21. A sliding bracket B23 having thrust or guide rollers B27 is slidably mounted to the guide frame 22. The reversible hydraulic motor 24 is fastened to the sliding bracket B23. The gear pinion 24A is secured to the hydraulic motor 24 and meshes with the toothed rack 26 which is fastened to the guide frame 22, same as in the first embodiment. When the motor 24 rotates the gear pinion 24A, the sliding bracket B23 moves along the guide frame 22.

A support arm B28 is pivotally mounted to the sliding bracket B23 by a cylindrical post 80 welded to the underside of the sliding bracket B23. Two bearings 81 and 82 are inserted between the post 80 and the support arm B28 for easy rotation of the arm B28 around the post 80. A holding disc or plate 85 is fastened to the post 80 by bolts 86 to keep the support arm B28 attached pivotally to the post 80. The post 80 has a centered round bore or opening 80A which has a keyway 80B. A drive in the form of a reversible hydraulic motor 83 is fastened to the support arm B28, with the motor 83 shaft inserted inside the opening 80A. The motor 83 has on its shaft a keyway 83A which mates the keyway 80B. A key bar 84 is inserted between the keyways 83A and 80B. When the motor 83 tries to rotate its shaft (which is pivotally fixed to the post 80 by the key bar 84), the motor 83 and the support arm B28 will rotate instead.

A rotatable frame B31 is pivotally mounted to the support arm B28 by a cylindrical post B36. The post B36 can rotate inside the support arm B28. The rotatable frame B31 is fastened to the post B36 by a pair of bolts 55.

The reversible hydraulic motor 32 is fastened to the support arm B28. The two piece coupling 35 and 35A is secured to the hydraulic motor 32 from one side and to the post B36 from the other side. When the hydraulic motor 32 rotates the coupling 35 and 35A, the post B36 and the rotatable frame B31 also rotate in the same direction. The thrust bearings 33 and 34 are inserted between the support arm B28 and the post B36 to allow the post B36 to rotate easily inside the support arm B28.

Figure 14:
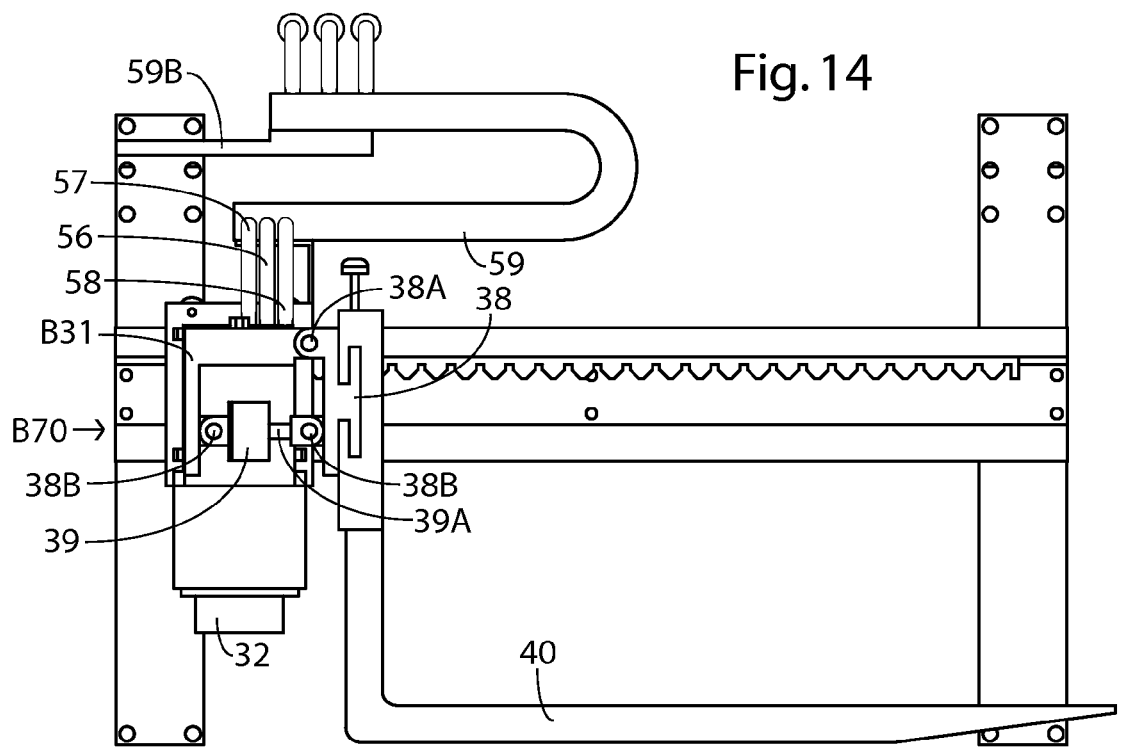
FIG. 14 is a side view of the alternative embodiment of the attachment.

In FIG. 14, a rotatable carriage assembly B70 includes the rotatable frame B31, the tiltable frame 38 and the cylinders 39 which have the pistons 39A. The tiltable frame 38 is pivotally mounted or hinged to the rotatable frame B31 by the hinge pin 38A. The hydraulic cylinders 39 and the pistons 39A are pivotally connected to the rotatable frame B31 from one side and to the tiltable frame 38 from the other side by the pivot pins 38B. The load forks 40 are mounted slidably to the tiltable frame 38.

Figure 12:
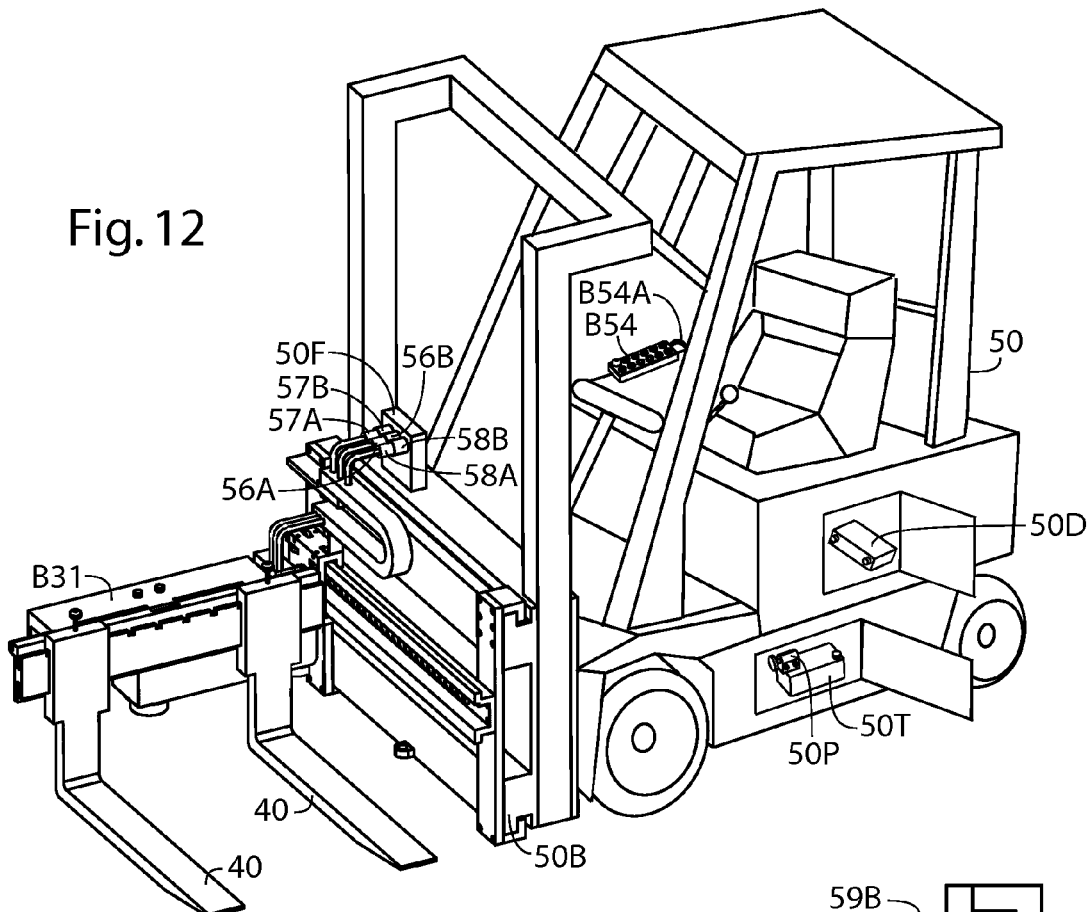
FIG. 12 is a perspective view of the forklift truck carrying the alternative embodiment of the attachment.
Figure 13:
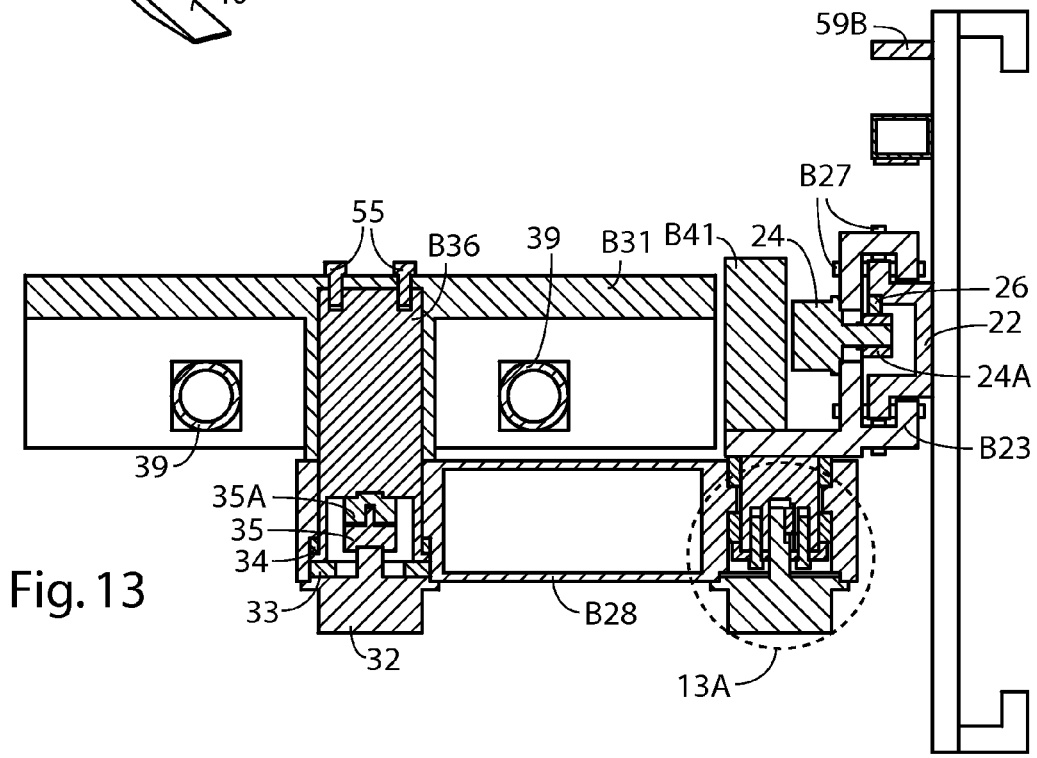
FIG. 13 is a sectional view of the alternative embodiment of the attachment at line 13-13 in FIG. 11.
Figure 13A:
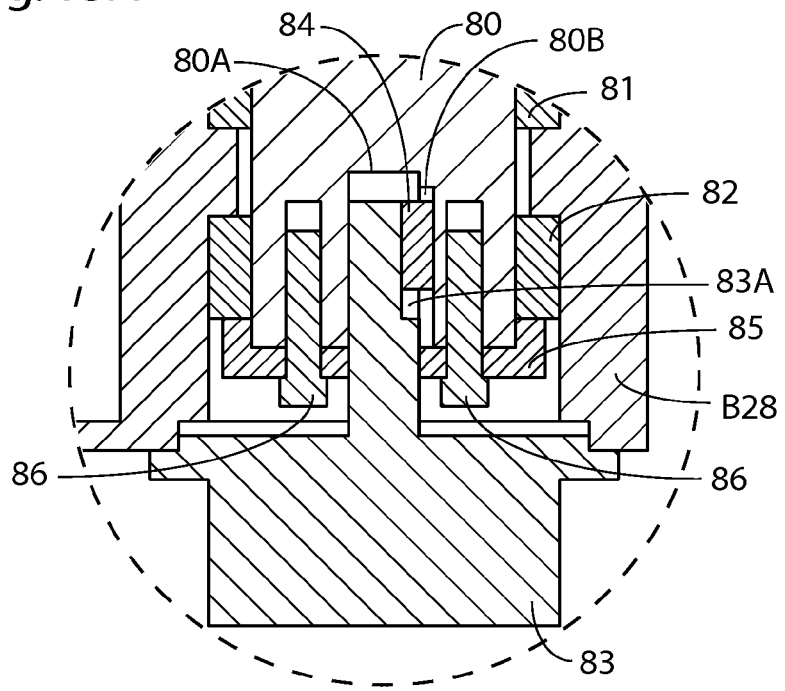
FIG. 13A is an enlarged view of the area 13A in FIG. 13.

In FIGS. 10, 12 and 15, a conventional hydraulic valves assembly B41 is receiving hydraulic pressure from a flexible hydraulic hose 57. The valves assembly B41 comprises hydraulic directional control valves BV39, BV24, BV32 and V83. The hose 57 has a conventional hydraulic fitting, quick connect-disconnect, or coupler 57A at its end. The hydraulic coupler 57A is connected to a hydraulic coupler 57B which in turn is connected to a hydraulic pump 50P which is a conventional part of the forklift truck 50. A flexible hydraulic hose 56 for hydraulic fluid return from the valves assembly B41 has a hydraulic coupler 56A at its end. The hydraulic coupler 56A is connected to a hydraulic coupler 56B which in turn is connected to a hydraulic source or tank 50T which is a conventional part of the forklift 50. The valves assembly B41 receives electrical power through a flexible multiconductor electrical cord or cable 58 which has an electrical plug connector 58A at its end. The electrical connector 58A is connected to an electrical receptacle connector 58B which in turn is connected to a wired remote control B54. A block or a plate 50F is fastened or welded to the carriage 50B and is holding or supporting the hydraulic couplers 57B, 56B and the electrical connector 58B. The remote control B54 comprises operation push buttons and switches B54B. A cable or cord B54A connects the remote control B54 to a forklift battery 50D (which is a conventional part of the forklift 50) and to the connector 58B which (as mentioned above) is connected to the connector 58A which in turn is connected to the valves assembly B41 by the cable 58.

The hydraulic hoses 57 and 56 and the cable 58 are running and protected inside a conventional flexible hose and cable carrier 59. The carrier 59 is secured from one end to a bracket 59A which is fastened or welded to the sliding bracket B23, and secured from the other end to a bracket 59B which is fastened or welded to the support bar B21. The carrier 59 allows the sliding bracket B23 to move along the guide frame 22 without tangling or damaging the hoses 57 and 56 or the cable 58. Different types of retractable hoses and cables (both not shown) may also be used.

The hydraulic couplers 57A and 56A, the electrical connector 58A and the hooks B21A allow the attachment B20 to be easily connected or disconnected to or from the forklift carriage 50B. It should be noted that the hydraulic couplers 57B and 56B are conventional or standard components in many types or brands of the forklift truck 50.

From the previous, the operation of the attachment B20 should be apparent. A driver (not shown) of the forklift 50 can rotate the load forks 40 to face the desired side of the forklift truck 50 by using the wired remote control B54 (which receives electrical power from the forklift battery 50D) to activate the valve BV32 to direct hydraulic pressure from the forklift pump 50P to the motor 32. The driver can shift the load forks 40 to either side of the forklift 50 by activating the valve BV24 to direct hydraulic pressure to the motor 24. The driver can raise or lower the load forks 40 by moving the carriage 50B upwards or downwards (which is a normal operation of the forklift truck 50). The driver can tilt the load forks 40 fore and aft if required by activating the valve BV39 to direct hydraulic pressure to the cylinders 39. The driver can rotate the support arm B28 ninety degrees to either side of the forklift truck 50 by activating the valve V83 to direct hydraulic pressure to the motor 83.

The purpose of the motor 83 and the reason for making the support arm B28 pivotally connected to the sliding bracket B23 is to reduce the distance between the load forks 40 and the forklift carriage 50B when the forklift truck 50 is used for front loading. In FIG. 16 the sliding bracket B23 was shifted to one side of the forklift truck 50 and the support arm B28 was rotated 90 degrees to the other side for better front loading capacity for the forklift truck 50.

Various changes can be made without departing from the scope of this embodiment, for example, the remote control B54 and the valves assembly B41 can be replaced with a hand operated hydraulic directional control valves assembly (not shown) that receives hydraulic pressure from the forklift pump 50P and sends it directly to each of the motors 24, 32, 83 and to the cylinders 39 by suitable hydraulic hoses (not shown). It is also possible to make the tiltable frame 38 capable of holding the forklift forks 50A, so that after the forklift forks 50A is disconnected from the forklift carriage 50B to connect the support bars B21, the forklift forks 50A can be mounted to the tiltable frame 38 to eliminate the need for the load forks 40. It is also possible to mount the guide frame 22 and the bracket 39B directly to the forklift carriage 50B by suitable fasteners or clamps (not shown), or even by welding if the forklift 50 is to be used for side loading permanently. It is also possible to make the guide frame 22 and the toothed rack 26 as part of the forklift carriage 50B during the manufacturing of the forklift truck 50, so that the sliding bracket B23 and the remaining parts of the attachment B20 can be connected to the forklift truck 50 whenever needed. It is also possible to mount the support arm B28 rigidly to the sliding bracket B23 or make them together as one part and eliminate the motor 83 and the post 80 if the attachment B20 is not intended to be used for front loading.

It is also possible that the attachment B20 has its own rechargeable battery, its own hydraulic pump, motor and tank, its own control unit, and its own wireless remote control (all not shown), same as in the first embodiment.

It is obvious in the first embodiment that the sliding bracket 23 can be made as one part with the support arm 28. It is also obvious that the tiltable frame 38 can be made as one part with the rotatable frame 31 (first embodiment) or B31 (second embodiment) and eliminate the cylinders 39 if the tilting feature for the load forks 40 is not needed.

From the previous, the reader will see that both attachments 20 and B20 can be connected or disconnected to or from the forklift truck 50 at substantial speed. Both enable the forklift 50 of side loading close to the forklift carriage 50B for adequate loading capacity, both are simple in design, durable and very economical and a practical solution to enable the forklift 50 to be used in narrow aisles. The reader will also see that the attachment 20 enables the forklift 50 to pick-up or release the pallet 61 at ground level to the side of the forklift 50 next to the forks 50A. Also, the attachment B20 can be used for front loading with adequate loading capacity.

While the above description contains many specifications, these should not be construed as limitations on the scope, as many other variations are possible. For example, belts, chains, sprockets, electrical motors, gear motors, threaded shafts and nuts (none of which are shown) can be used to achieve the rotation or the linear movement of the various parts of the invention. Limit switches, sensors, stoppers, motion and speed controls, flow and pressure regulators (none are shown) can be incorporated in the embodiments to control the various movements and positions of the moving parts. It is also possible to use the invention with trucks other than conventional forklift trucks with suitable minor modifications.

The invention claimed is:

1. A remotely controlled side loading attachment for use with a forklift truck having a pair of forwardly extending forks, said attachment comprising:
    a support frame having a pair of hollow sleeves to receive said forklift forks;
    a guide frame rigidly secured to said support frame;
    a sliding bracket slidably mounted to said guide frame;
    first drive means to effect movement of said sliding bracket along said guide frame;
    a support arm rigidly secured to said sliding bracket;
    a rotatable carriage pivotally and elevatably mounted to said support arm;
    second drive means to effect rotation of said rotatable carriage;
    an elevating hydraulic cylinder mounted to said support arm from one end and to said rotatable carriage from the other end to effect elevating movement of said rotatable carriage relatively to said support arm;
    a pair of load forks mounted to said rotatable carriage;
    a control unit for controlling said elevating hydraulic cylinder and said first and second drive means; and
    a remote control for sending control signals to said control unit;
    whereby a driver of said forklift truck using said remote control can rotate said load forks to face either side of said forklift truck and can shift said load forks laterally to the longitudinal axis of said truck and can activate said elevating hydraulic cylinder to enable said load forks to operate adjacent to said forklift forks to engage a palletized load at ground level to the side of said truck then activate said elevating hydraulic cylinder again to lift said palletized load up then activate said first drive means to shift said palletized load from above said forklift forks during side loading operation.

2. The attachment of claim 1 further comprising a hydraulic pump, said hydraulic pump is controlled by said control unit to direct hydraulic pressure from said hydraulic pump to said elevating cylinder and to said first and second drive means.

3. The attachment of claim 1 further comprising a rechargeable battery to provide electrical power to said control unit.

4. The attachment of claim 1 wherein said rotatable carriage further comprising:
    a rotatable frame;
    a tiltable frame; and
    at least one tilting hydraulic cylinder;
    said tillable frame is connected pivotally to said rotatable frame, said tilting hydraulic cylinder is controlled by said remote control and is connected pivotally to said rotatable frame from on end and connected pivotally to said tiltable frame from the other end to tilt said load forks fore and aft during side loading operation.

5. The attachment of claim 1 wherein said support arm further comprises plurality of telescopic members to advance said load forks forwardly beyond said forklift forks so that said load forks can be lowered to ground level.

6. A remotely controlled detachable front and side loading attachment for use with a forklift truck having an elevatable carriage at its front, a hydraulic pump and a hydraulic tank, said attachment comprising:
    a guide frame rigidly secured to said forklift carriage;
    a sliding bracket slidably mounted to said guide frame;
    first drive means to effect movement of said sliding bracket along said guide frame;
    a support arm pivotally mounted to said sliding bracket;
    second drive means to effect rotation of said support arm to either side of said forklift truck;
    a rotatable carriage pivotally mounted to said support arm;
    third drive means to effect rotation of said rotatable carriage;
    a pair of load forks mounted to said rotatable carriage;
    hydraulic valves assembly for controlling said first, second and third drive means;
    hydraulic hoses to connect said hydraulic valves assembly to said forklift pump and tank; and
    a remote control for sending control signals to said hydraulic valves assembly;
    whereby a driver of said truck using said remote control can rotate said load forks to face either side of said truck and can shift said load forks laterally to a longitudinal axis of said truck for depositing and retrieving a load to the side of said truck and can rotate said support arm to either side of said truck to reduce the distance between said load forks and said forklift carriage to increase front loading capacity for said truck.

7. The attachment of claim 6 wherein said rotatable carriage further comprising:
    a rotatable frame;
    a tiltable frame; and
    at least one hydraulic cylinder;
    said tiltable frame is connected pivotally to said rotatable frame, said hydraulic cylinder is controlled by said hydraulic valves assembly and is connected pivotally to said rotatable frame from one end and connected pivotally to said tiltable frame from the other end to tilt said load forks fore and aft during side loading operation.

\* \* \* \* \*